United States Patent
Gorelik

(10) Patent No.: US 8,362,947 B2
(45) Date of Patent: Jan. 29, 2013

(54) METHOD FOR OBTAINING OBJECT-PLANE FIELD FROM ITS TWO IMAGES

(76) Inventor: Victor Gorelik, Brooklyn, NY (US)

(*) Notice: Subject to any disclaimer, the term of this patent is extended or adjusted under 35 U.S.C. 154(b) by 161 days.

(21) Appl. No.: 13/074,880

(22) Filed: Mar. 29, 2011

(65) Prior Publication Data

US 2012/0249362 A1    Oct. 4, 2012

(51) Int. Cl.
*G01S 13/00*    (2006.01)
(52) U.S. Cl. .............. 342/179; 342/25 R; 342/25 A; 342/195; 342/196
(58) Field of Classification Search ............ 342/25 R, 342/25 A, 25 B, 25 C, 25 D, 25 E, 25 F, 179, 342/195, 196
See application file for complete search history.

(56) References Cited

U.S. PATENT DOCUMENTS

| | | | |
|---|---|---|---|
| 4,616,227 A * | 10/1986 | Homma et al. | 342/25 A |
| 4,768,156 A * | 8/1988 | Whitehouse et al. | 382/279 |
| 4,924,229 A * | 5/1990 | Eichel et al. | 342/25 E |
| 5,243,351 A * | 9/1993 | Rafanelli et al. | 342/351 |
| 5,943,006 A * | 8/1999 | Crane et al. | 342/196 |
| 5,969,662 A * | 10/1999 | Hellsten | 342/25 A |
| 6,046,695 A * | 4/2000 | Poehler et al. | 342/25 A |
| 6,088,295 A * | 7/2000 | Altes | 367/103 |
| 6,155,704 A * | 12/2000 | Hunt et al. | 342/25 F |
| 6,344,893 B1 * | 2/2002 | Mendlovic et al. | 356/3.14 |
| 6,928,182 B1 * | 8/2005 | Chui | 382/131 |
| 7,869,627 B2 * | 1/2011 | Northcott et al. | 382/117 |
| 7,978,120 B2 * | 7/2011 | Longstaff | 342/22 |
| 8,044,846 B1 * | 10/2011 | Urkowitz et al. | 342/179 |
| 8,213,740 B1 * | 7/2012 | Rikoski | 382/278 |
| 2006/0227038 A1 * | 10/2006 | Ohnishi | 342/93 |
| 2007/0247353 A1 * | 10/2007 | Budic | 342/159 |
| 2009/0221920 A1 * | 9/2009 | Boppart et al. | 600/476 |
| 2009/0224962 A1 * | 9/2009 | Pao et al. | 342/179 |
| 2009/0243916 A1 * | 10/2009 | Beeri et al. | 342/179 |
| 2010/0220001 A1 * | 9/2010 | Longstaff | 342/22 |
| 2011/0134249 A1 * | 6/2011 | Wood et al. | 348/164 |
| 2012/0249362 A1 * | 10/2012 | Gorelik | 342/179 |

* cited by examiner

*Primary Examiner* — Jack W Keith
*Assistant Examiner* — Peter Bythrow

(57) ABSTRACT

The invention provides a method for obtaining the object-plane field without a pure theoretical estimation or a direct experimental measurement of a point spread function (PSF) of an imaging system. Instead, at least two image-plane fields have to be recorded. It is essential that the resolutions of the system producing the images have to be quite different from each other. Although both PSFs of the system are unknown, the recording conditions have to be chosen so that the second PSF could be expressed via the first PSF. Two integral equations—(1) a convolution of the object-plane field with the first PSF and (2) a convolution of the object-plane field with the second PSF (expressed via the first PSF)—can be reduced to one functional equation in the Fourier space. The reverse Fourier transform of the solution of this equation is the object-plane field.

2 Claims, 3 Drawing Sheets

METHOD FOR OBTAINING OBJECT-PLANE FIELD FROM ITS TWO IMAGES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This invention relates generally to remote sensing and in particular to high-resolution imaging.

Spatial resolution of images is limited by the fact that an infinitely small point in the object plane appears in the image plane as a point that is spread out, consistent with a two-dimensional point-spread function (PSF) of an imaging system. For linear imaging systems, an image-plane field is mathematically equal to a convolution of the object-plane field with a PSF of an imaging system. The problem is to determine the object-plane field when an image-plane field is known.

The common way to solve this kind of problem is to estimate a PSF theoretically and then to apply a deconvolution technique to determine the object-plane field; see, for example, U.S. Pat. No. 7,869,627 from Jan. 11, 2011 by Northcott et al.

Another way to solve the problem is to determine a PSF directly by an experiment. It can be done by a simulation of an infinitely small object and then recording its image. This image represents the PSF that is used in further deconvolution; see, for example, U.S. Pat. No. 6,928,182 from Aug. 9, 2005 by Chui et al.

It is important that deconvolution methods are noise sensitive: a small change in a PSF can lead to big changes in the calculated object-plane field; this is a so-called ill-posed problem. There are methods for solving such problems using some additional information; see, for example, Tychonoff A. N. and Arsenin V. Y., *Methods for Incorrect Problems Solution*, Nauka, Moscow, 1986 and Wiener N., *The extrapolation, interpolation and smoothing of stationary time series*, New York, John Wiley & Sons, 1949.

However, a pure theoretical estimation of a PSF as well as its direct experimental measurement often does not guarantee the needed precision of the PSF and does not provide needed information for solving the problem. As a result, calculations of the object-plane field in these cases can lead to unpredictable distortions.

SUMMARY OF THE INVENTION

It is the purpose of the present invention to provide a method for obtaining the object-plane field without a pure theoretical estimation or a direct experimental measurement of a PSF of an imaging system.

According to the invention, in order to get the object-plane field, at least two image-plane fields have to be recorded. It is essential that the resolutions of an imaging system producing these two images have to be quite different from each other. Although both PSF of the system are unknown, the recording conditions have to be chosen so that the second PSF could be expressed via the first PSF.

Two integral equations—(1) the first image-plane field equal to a convolution of the object-plane field with the first PSF and (2) the second image-plane field equal to a convolution of the object-plane field with the second PSF (expressed via the first PSF)—allow calculating the object-plane field and the first PSF.

The present invention has an advantage over known pure theoretical approach. Instead of an exact formula for a PSF like, for example, "the Bessel function of the first kind", the invention needs just a relationship between two PSFs. For example, "the second PSF is equal to the first PSF with double arguments". Such kind of a relationship is a consequence of general physical laws, and it is more precise and reliable than specific laws for a pure theoretical estimation of a PSF of an imaging system.

The invention also has an advantage over known experimental approach because it is based on a simulation of an infinitely small object, which is impossible to implement with a good precision. Besides, the simulation of an infinitely small object and recording an image of interest are being done separately in time and in different recording conditions. All these make using an experimentally measured PSF questionable.

More important is that the present invention works in cases when neither a pure theoretical estimation nor a direct experimental measurement of a PSF is possible, for example, when a PSF depends on unknown factors.

DETAILED DESCRIPTION OF THE INVENTION

Figure 1:
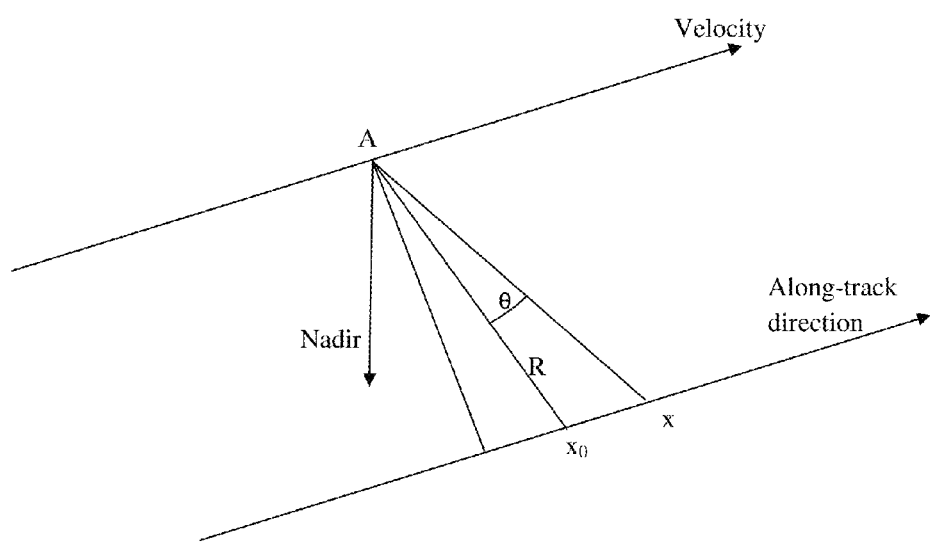
FIG. 1 illustrates an exemplary geometry of a radar imaging system.

FIG. 1 illustrates an exemplary geometry of a radar imaging system. The receiving antenna A is illuminated by thermal emission of microwaves from the Earth. The antenna is aimed at the point $x_0$ in the direction perpendicular to the velocity of the antenna.

An image-plane field is a two-dimensional convolution of the object-plane field with a PSF of the imaging system. One dimension is the along-track direction x; the other dimension is the direction perpendicular to x—the cross-track direction y. According to the invention, this two-dimensional convolution is being presented as a sequence of two one-dimensional convolutions: (1) a convolution in the along-track direction x and (2) a convolution in the cross-track direction y.

In this exemplary embodiment of the invention, the object-plane field is thermal emission from the Earth, an image-plane field is an image recorded by the imaging system, and a PSF of the system is defined by a radiation pattern of the receiving antenna.

A radiation pattern of a receiving antenna depends on the diameter D of the reflector of the antenna and the wavelength $\lambda$ of a signal. The pattern has the main lobe and sidelobes described by the function of the receiving direction from x to A defined by the angle $\theta$:

$$\left(\frac{J_1\left(\frac{\pi D}{\lambda}\sin\theta\right)}{\frac{\pi D}{\lambda}\sin\theta}\right)^2,$$

where $J_1(u)$ is the first-order Bessel function of the first kind. The pattern reaches the central maximum at $\theta=0$ and has a number of weaker side maximums. The signals received through the sidelobes overlap the signals received through the main lobe and decrease the resolution of an image.

Even if there were no sidelobes, a recorded image would still be distorted because of the finite width of the main lobe.

The geometry of the imaging system for recording images shown in the FIG. 1 implies small values for $\theta$. It is known that the following approximation can be done: $\sin\theta=\tan\theta=(x-x_0)/R$, where R is the distance from the antenna to the point $x_0$. It means that the amount of thermal emission received along the direction defined by the angle $\theta$ can be expressed via $(x-x_0)$, and that the intensity of an image at the point $x_0$ is $$I(x_0) = \int_{-\infty}^{\infty} A(x_0 - x)S(x)dx,$$

where $A(x_0-x)$ is the PSF of the imaging system derived from the radiation pattern of the antenna, and $S(x)$ is the unknown thermal emission from the point x.

According to the invention, at least two images of the intensity $I(x_0)$ has to be recorded by the imaging system. The first image is recorded while a ratio of the diameter $D_1$ of the reflector of the antenna to the wavelength $\lambda_1$ equal to $r_1=D_1/\lambda_1$:

$$I_1(x_0) = \int_{-\infty}^{\infty} A_1(x_0 - x)S(x)dx$$

and the second image is recorded while a ratio of the diameter $D_2$ of the reflector of the antenna to the wavelength $\lambda_2$ equal to $r_2=D_2/\lambda_2$:

$$I_2(x_0) = \int_{-\infty}^{\infty} A_2(x_0 - x)S(x)dx$$

Figure 2:
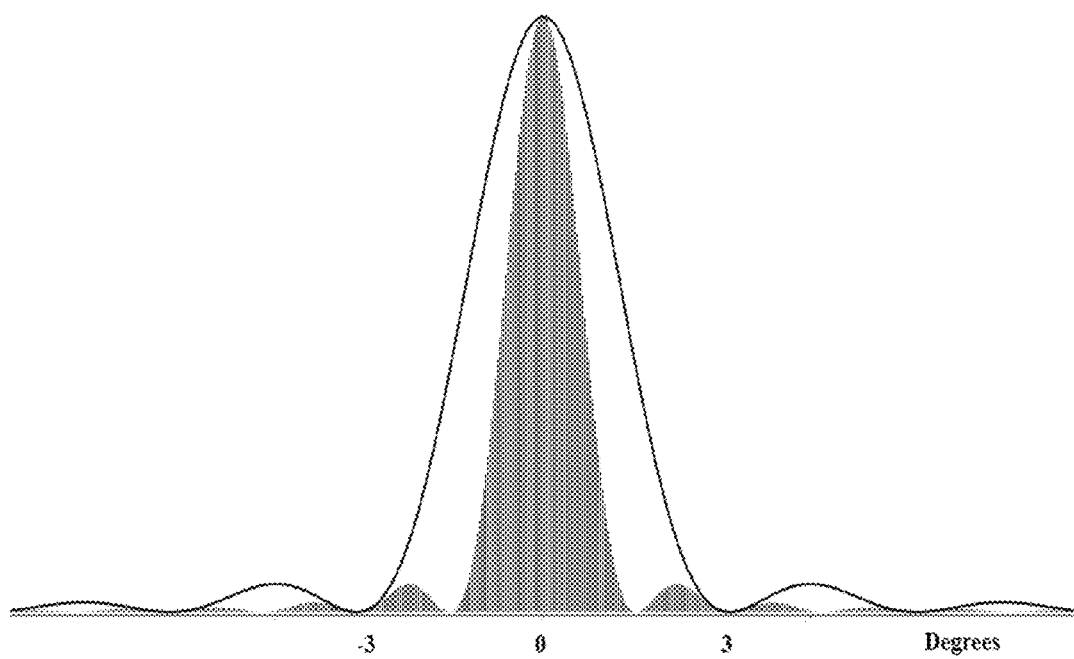
FIG. 2 illustrates a relationship between two PSFs of the imaging system; each PSF corresponds to a specific ratio of the diameter of the reflector of the antenna of the system to the wavelength of microwaves in remote sensing of the Earth.

FIG. 2 illustrates a relationship between two PSFs of the imaging system used for the recording:

$$A_2(x_0-x)=A_1(m(x_0-x)),$$

where the first PSF—$A_1(x_0-x)$ is shown as the line, the second PSF—$A_2(x_0-x)$ is shown as the histogram, and $m=r_2/r_1=2$. This relationship is a straightforward consequence of the fact that the radiation pattern is a function of $D*(x_0-x)/\lambda$, no matter if it is the Bessel function or any other function.

According to the invention, the two recorded intensities $I(x_0)$ are being written in the Fourier space:

$$i_1(w) = a_1(w)s(w)$$

$$i_2(w) = \frac{1}{m}a_1\left(\frac{w}{m}\right)s(w)$$

where w is an angular frequency, $i_1(w)$, $i_2(w)$, $a_1(w)$, and $s(w)$ are the Fourier transforms of $I_1(x_0)$, $I_2(x_0)$, $A_1(x_0-x)$, and $S(x)$ respectively.

According to the invention, $i_1(w)$ is calculated from the result of the recording $I_1(x_0)$. After that, $i_1(w)$ is spread out by the coefficient m in order to obtain $i_1(w/m)$. It allows rewriting the previous system of two equations as $$i_1\left(\frac{w}{m}\right) = a_1\left(\frac{w}{m}\right)s\left(\frac{w}{m}\right)$$

$$i_2(w) = \frac{1}{m}a_1\left(\frac{w}{m}\right)s(w)$$

Dividing the second equation of this system by the first one gives $$\frac{s(w)}{s(w/m)} = g(w),$$

where $$g(w) = \frac{mi_2(w)}{i_1(w/m)}$$

is the function known from the recording.

According to the present invention, the solution of the equation $$\frac{s(w)}{s(w/m)} = g(w)$$

is $$s(w) = g(w)g\left(\frac{w}{m}\right)g\left(\frac{w}{m^2}\right)g\left(\frac{w}{m^3}\right)\ldots .$$

This solution follows from the fact that the substitutions $$s(w) = g(w)g\left(\frac{w}{m}\right)g\left(\frac{w}{m^2}\right)g\left(\frac{w}{m^3}\right)\ldots$$

and $$s\left(\frac{w}{m}\right) = g\left(\frac{w}{m}\right)g\left(\frac{w}{m^2}\right)g\left(\frac{w}{m^3}\right)g\left(\frac{w}{m^4}\right)\ldots$$

in the equation $$\frac{s(w)}{s(w/m)} = g(w)$$

lead to $g(w)=g(w)$, so $$s(w) = g(w)g\left(\frac{w}{m}\right)g\left(\frac{w}{m^2}\right)g\left(\frac{w}{m^3}\right)\ldots = \prod_{k=0}^{\infty} g\left(\frac{w}{m^k}\right)$$

is a formal solution of the equation. Under usual assumptions regarding the functions $I(x_0)$, $A(x-x_0)$, and $S(x)$ that they are continuous and have derivatives, this solution exists (the product has a limit) and is unique up to a constant multiplier.

According to the present invention, after the Fourier transform $s(w)$ is calculated, the function $S(x)$ is calculated as the reverse Fourier transform of $s(w)$.

Below is a numerical example of the proposed method in the assumptions that $S(x)=\exp(-x^2/8)$ and $m=2$. The Fourier transform of $S(x)$ is $s(w) = 2\sqrt{2\pi} \exp(-2w^2)$, so $s(w/2) = 2\sqrt{2\pi} \exp\left(-\frac{1}{2}w^2\right)$, and $$g(w) = \frac{mi_2(w)}{i_1\left(\frac{w}{m}\right)}$$

$$= \frac{ma_2(w)s(w)}{a_1\left(\frac{w}{m}\right)s\left(\frac{w}{m}\right)}$$

$$= \frac{m\frac{1}{m}a_1\left(\frac{w}{m}\right)s(w)}{a_1\left(\frac{w}{m}\right)s\left(\frac{w}{m}\right)}$$

$$= \frac{s(w)}{s\left(\frac{w}{m}\right)}$$

$$= \exp(-1.5w^2),$$

no matter what $a_1(w)$ is: different formulas for $a_1(w)$ lead to the same result for $g(w)$.

In reality, the calculations are being performed in reverse order: (1) the function $g(w)$ is known from the recording and (2) the function $S(x)$ has to be calculated. According to the formula proposed in the present invention $$s(w) = \prod_{k=0}^{\infty} g\left(\frac{w}{m^k}\right)$$

$$= \exp(-1.5w^2)\exp\left(-1.5\frac{w^2}{4}\right)\exp\left(-1.5\frac{w^2}{16}\right)\exp\left(-1.5\frac{w^2}{64}\right)\ldots =$$

$$= \exp\left(-1.5w^2\left(1 + \frac{1}{4} + \frac{1}{16} + \frac{1}{64} + \ldots\right)\right)$$

$$= \exp(-2w^2)$$

The result $s(w)=\exp(-2w^2)$ proves that in the case of $S(x)=\exp(-x^2/8)$ and $m=2$, the product has the limit equal to the correct function $\exp(-2w^2)$, which defines $s(w)$ with the accuracy up to the constant multiplier $2\sqrt{2\pi}$.

Figure 3:
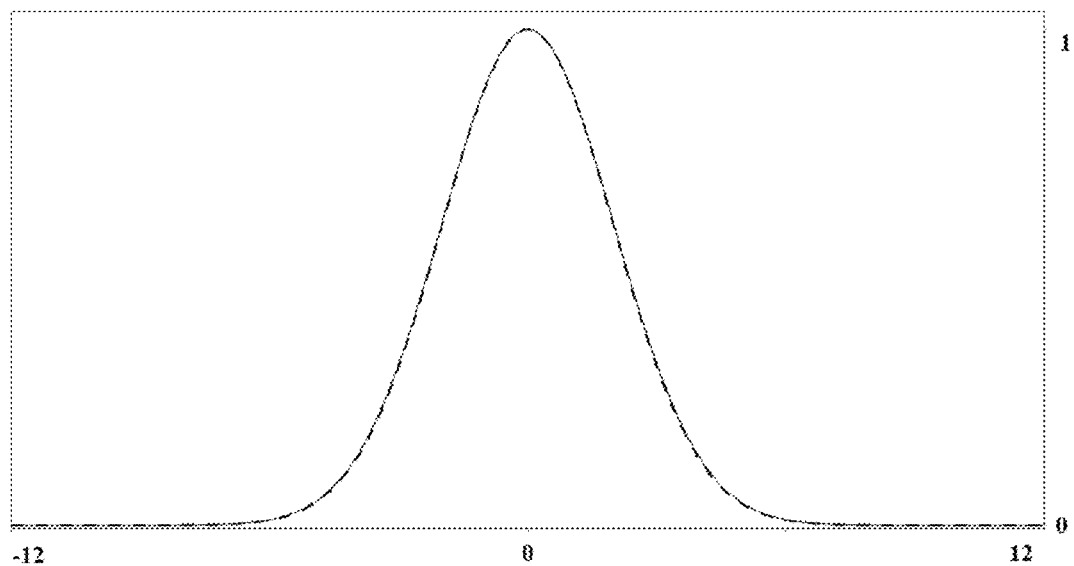
FIG. 3 illustrates a comparison of the object-plane field calculated by the method of the present invention and the actual object-plane field.

In reality, in order to calculate the product, the finite number of terms is used. If, for example, the number of terms is equal to 3, then $s(w)=\exp(-1.5w^2)\exp(-1.5w^2/4)\exp(-1.5w^2/16)=\exp(-63w^2/32)$. The reverse Fourier transform of $\exp(-63w^2/32)$ is equal to $\exp(-8x^2/63)/\text{sqrt}(126\pi/16)$. FIG. 3 shows the actual function $S(x)=\exp(-x^2/8)$ (the solid line) and the calculated function $\exp(-8x^2/63)$ (the dashed line). These two lines practically coincide. It illustrates the fact that the method of the invention provides a way of precise calculation of the object-plain field $S(x)$.

In problems where the point spread function $A_1(x_0-x)$ or $A_2(x_0-x)$ not the object-plain field $S(x)$ needs to be found, the following system of two equations has to be used:

$$i_1(w) = a_1(w)s(w)$$

$$i_2(w) = \frac{1}{m}a_1\left(\frac{w}{m}\right)s(w),$$

which has the following solution $$a_1(w) = \prod_{k=0}^{N} f\left(\frac{w}{m^k}\right),$$

where $f(w) = \frac{i_1(w)}{mi_2(w)}$.

Although the present invention has been described in terms of the preferred embodiments, it is to be understood that the disclosure is not to be interpreted as limiting. Various modifications will become apparent to those skilled in the art after having read this disclosure. For example, the method proposed in the present invention is valid for a wide range of imaging systems besides the exemplary embodiment of the passive microwave remote sensing, particularly for active radar systems. Accordingly, it is intended that the appended claims be interpreted as covering all alterations and modifications within the spirit and scope of the invention.

The invention claimed is:

1. A method for obtaining the object-plane field $S(x)$, running on a system that includes radar imaging system and a computer processor, comprising:
    recording the first image $I_1(x_0)$ as a data structure in the memory of the processor while the point spread function of the radar imaging system is described by an unknown function $A_1(x_0-x)$;
    recording the second image $I_2(x_0)$ as a data structure in the memory of the processor while the point spread function of the radar imaging system is described by an unknown function $A_2(x_0-x)=A_1[m(x_0-x)]$, where m is in the range from 1.2 to 3;
    using the processor for solving the system of the following two integral equations:

$$I_1(x_0) = \int_{-\infty}^{\infty} A_1(x_0 - x)S(x)\,dx$$

$$I_2(x_0) = \int_{-\infty}^{\infty} A_1[m(x_0 - x)]S(x)\,dx$$

with respect to the object-plane field $S(x)$ and the point spread function $A_1(x_0-x)$ and for displaying the resulting image of $S(x)$.

2. A method of the claim 1, where
    the step of the recording the first image-plane field $I_1(x_0)$ is executed by the radar imaging system with a ratio of the diameter of the reflector of the antenna to wavelength equal to $r_1$;
    the step of the recording the second image-plane field $I_2(x_0)$ is executed by the radar imaging system with a ratio of the diameter of the reflector of the antenna to wavelength equal to $r_2 = m\,r_1$;
    the step of the solving the system of two integral equations is executed by calculating the object-plane field $S(x)$ as the reverse Fourier transform of the function $$s(w) = \prod_{k=0}^{N} g\left(\frac{w}{m^k}\right),$$

where $g(w) = \frac{mi_2(w)}{i_1(w/m)}$, $i_1(w)$ is the Fourier transform of the first image-plane field $I_1(x_0)$,
$i_2(w)$ is the Fourier transform of the second image-plane field $I_2(x_0)$, and N is in the range from 3 to 9.

* * * * *